No. 814,165. PATENTED MAR. 6, 1906.
C. REA & J. W. PATTISSON.
CAKE AND CRACKER BOX AND PACKAGE STAND.
APPLICATION FILED JAN. 3, 1905.
2 SHEETS—SHEET 1.
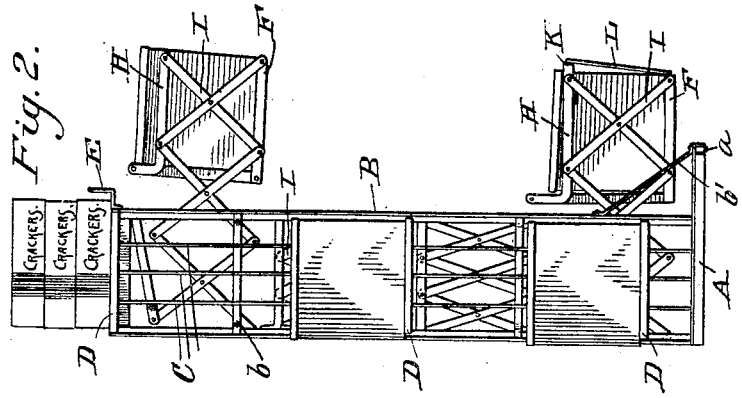
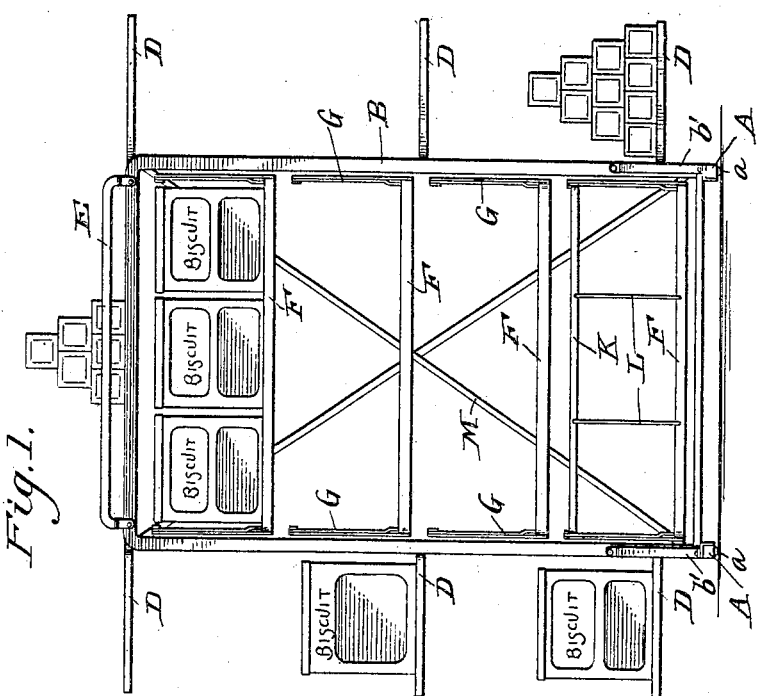
Witnesses:
James M. Rea
Allen G. Burris,
Inventors
Claude Rea
John W. Pattisson No. 814,165. PATENTED MAR. 6, 1906.
C. REA & J. W. PATTISSON.
CAKE AND CRACKER BOX AND PACKAGE STAND.
APPLICATION FILED JAN. 3, 1905.
2 SHEETS—SHEET 2.
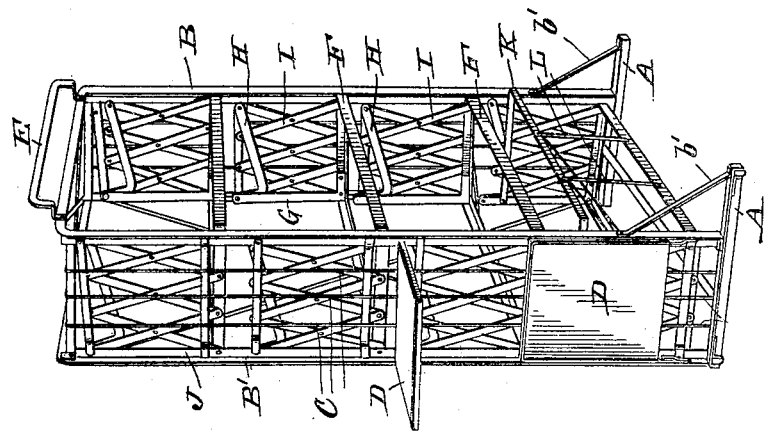
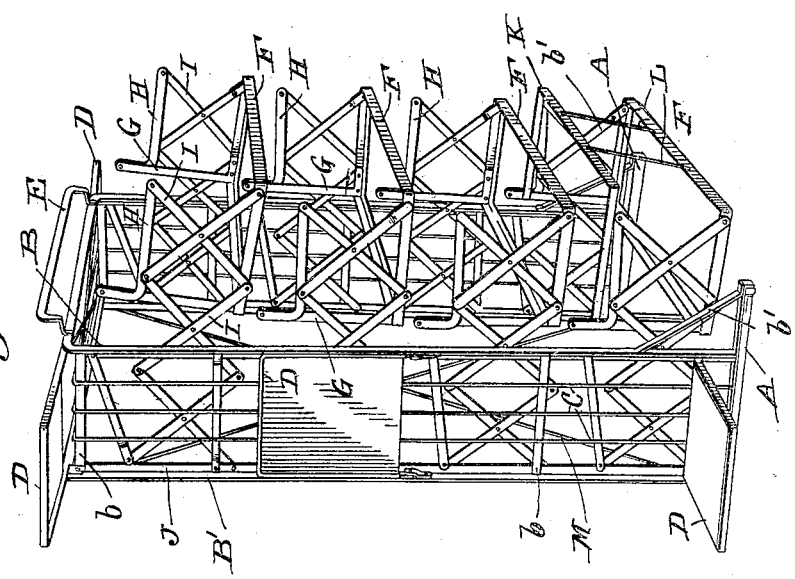
Witnesses: James M. Rea, Allen J. Burris.
Inventor: Claude Rea, John W. Pattisson

UNITED STATES PATENT OFFICE.

CLAUDE REA AND JOHN WILLIAM PATTISSON, OF SAVANNAH, MISSOURI.

CAKE AND CRACKER BOX AND PACKAGE STAND.

No. 814,165.   Specification of Letters Patent.   Patented March 6, 1906.

Application filed January 3, 1905. Serial No. 239,544.

*To all whom it may concern:*

Be it known that we, CLAUDE REA and JOHN WILLIAM PATTISSON, citizens of the United States, residing at Savannah, in the county of Andrew and State of Missouri, have invented certain new and useful Improvements in Cake and Cracker Box and Package Stands, of which the following is a specification.

Our invention relates to racks or stands for holding and exhibiting boxes and packages containing cakes and crackers, and has for its object the provision of a device of this character that will accommodate the maximum number of boxes of cakes and crackers, giving ready access to each individual box at the minimum expenditure of space and at the same time is ornamental in nature and easily kept clean.

The construction and advantages of our invention will be explained in detail hereinafter and found illustrated in the accompanying drawings, in which—

Figure 1 is a front view in elevation, showing the stand partly filled with cracker and cake boxes and packages; Fig. 2, a side view in elevation, showing the top and bottom shelves in position to get at the contents of the boxes thereon; and Figs. 3 and 4 views in perspective, showing the shelves in their delivery position and closed into the stand, respectively.

In the drawings similar reference characters indicate corresponding parts throughout the several views.

A represents the base-pieces, preferably mounted on casters $a$, and B B' upright inverted-U-shaped frames made of angle-iron and secured to base-pieces A and spaced apart by means of horizontal rods $b$. The front frame B is braced by rods B' to the front ends of base-pieces A, the said base-pieces being extended for this purpose.

C represents rods extended around the upright frame.

D represents shelves hinged to the uprights B B' and adapted to extend laterally from the frame for the reception of cake and cracker boxes and packages, as shown in Fig. 1, while E represents a rod secured to the top of upright B, which may be used for the reception of advertising matter and at the same time serve to hold packages and boxes on the top of the stand, as shown in Figs. 1 and 2.

F represents rectangular shelves made of angle-iron with the angular portion turned in, on which are adapted to be seated boxes of cakes and crackers, as shown in Figs. 1 and 2.

G represents vertical rods secured to the rear corners of each shelf F, and H L-shaped levers pivotally secured to the upper end of each rod G.

I represents lazy-tongs pivotally secured near the front of frames F and to the free ends of levers H and the other ends to the upright B' and to the free ends of rods J, pivotally secured to upright B. This construction, it will be seen by reference to Figs. 2, 3, and 4, permits the shelves F to be drawn outside of the upright frame or returned thereinto, as desired, the levers H and pivoted rods J permitting the expansion and contraction of the lazy-tongs I necessary for this purpose.

K represents a U-shaped frame secured to uprights G on the bottom shelf F and having its front supported by rods L to be used as a handhold in operating said shelf.

M represents braces at the back of the frame.

Having thus described our invention, what we claim is—

1. In a device of the character described, an upright frame, shelves, uprights on said shelves, and lazy-tongs having one end secured to said upright frame and the other ends to said shelves and the uprights thereon, substantially as shown and described.

2. In a device of the character described, an upright frame, shelves, uprights at the rear end of said shelves, and lazy-tongs having one end secured to said upright frame and the other ends to the front of said shelves and connected with said uprights, substantially as shown and described.

3. In a device of the character described, an upright frame, rods pivotally secured thereto, lazy-tongs having one end pivotally secured to said frame and said rods, shelves having uprights thereon, L-shaped levers pivotally secured to said uprights, and the free ends of said lazy-tongs secured to said shelves and the free ends of said levers, substantially as shown and described.

4. In a device of the character described, base-pieces, inverted-U-shaped uprights secured to said base-pieces, horizontal rods secured to said U-shaped uprights rods pivotally secured to one of said uprights, lazy-tongs secured to the other upright and to said rods, shelves, vertical rods secured to said shelves, and L-shaped levers pivotally secured to said vertical rods, the free ends of said lazy-tongs being pivotally secured to said shelves and L-shaped levers, substantially as shown and described.

5. In a device of the character described, base-pieces, inverted-U-shaped uprights, secured to said base-pieces, horizontal rods secured to said U-shaped uprights, rods pivotally secured to one of said uprights, lazy-tongs secured to the other upright and to said pivoted rods, shelves made of angle-iron, vertical rods secured to said shelves, L-shaped levers pivotally secured to said vertical rods, the free ends of said lazy-tongs being pivotally secured to said shelves and L-shaped levers and shelves pivotally secured on the outside of said U-shaped uprights, substantially as shown and described.

In testimony whereof we have signed our names to this specification in the presence of two subscribing witnesses.

CLAUDE REA.
JOHN WILLIAM PATTISSON.

Witnesses:
ALLEN J. BURRIS,
NEWTON C. HERSHBERGER.